United States Patent Office 3,419,469
Patented Dec. 31, 1968

3,419,469
PRODUCTION OF CARBOXYLIC ACIDS BY MICROBIOLOGICAL OXIDATION OF HYDROCARBONS
Arthur E. Humphrey, Drexel Hill, Pa., and Richard L. Raymond, Wilmington, Del., assignors to Sun Oil Company, Philadelphia, Pa., a corporation of New Jersey
No Drawing. Filed Dec. 8, 1965, Ser. No. 512,543
10 Claims. (Cl. 195—28)

ABSTRACT OF THE DISCLOSURE

Improved yield of carboxylic acids by the fermentation of hydrocarbons is obtained by carrying out the fermentation in the presence of an anion exchange resin. The carboxylic transformation product is recovered from the resin.

---

This invention relates to the fermentation of hydrocarbons by means of carboxylic acid-forming microorganisms. More particularly the invention is directed to the microbiological oxidation of hydrocarbons by action of hydrocarbon-consuming microorganisms that are capable of forming one or more carboxylic transformation products, such action being carried out in the presence of an anion exchange resin. Presence of the anion exchange resin during the fermentation results in a distinctly improved yield of the desired carboxylic acid product.

The microbiological oxidation of hydrocarbons by means of microorganisms capable of producing carboxylic acid products has been considered heretofore by numerous investigators. A recent comprehensive review of the subject appears in the textbook, "Advances in Enzymology," vol. 27, pages 469–546 (Interscience Publishers, 1965). Many microorganisms are capable of utilizing hydrocarbons as a source of carbon and some of these microorganisms, instead of converting the hydrocarbon either to cellular material or carbon dioxide and water, will effect transformations to intermediate metabolic products which accumulate in the fermentation mixture. Various types of oxygenated hydrocarbon products have been produced in such fermentation reactions. Carboxylic acids often accumulate as a result of the microbiological action. Microorganisms capable of doing this include bacteria, yeasts, molds and actinomycetes. Genera in which hydrocarbon-consuming microorganisms usually fall that are capable of yielding transformation products having carboxyl groups are Micrococcus, Corynebacterium, Nocardia, Pseudomonas, Mycobacterium, Streptomyces, Aspergillus and Acetobacter.

Many different hydrocarbons can be oxidized through microbiological action of such organisms to yield carboxylic transformation products. This applies to paraffins ranging from methane to waxes, to olefins of widely varying molecular weights, to alkylnaphthenes and to aromatics including benzene, alkylbenzenes, naphthalene, alkylnaphthalenes, anthracene, phenanthrene and the like. A few specific examples of hydrocarbon oxidations which have been effected to yield carboxylic acids are as follows: benzoic acid or phenylacetic acid from n-alkylbenzenes having, respectively, an odd or even number of carbon atoms in the alkyl group (Davis and Raymond United States Patent No. 3,057,784); cyclohexane acetic acid from n-butylcyclohexane; muconic acid from benzene; salicylic acid from naphthalene (Brillaud United States Patent No. 3,183,169); methylnaphthoic acids from dimethylnaphthalenes; hydroxynaphthoic acids from anthracene and phenanthrene; adipic and pimelic acids from Decalin; and methylhexanoic acids from 2-methylhexane. Numerous other oxidations producing carboxylic acid products from hydrocarbons are described in the textbook reference mentioned above and the prior art references therein cited.

The present invention is directed to an improvement in the fermentation of hydrocarbons by means of microorganisms that form carboxylic transformation products. It has now been found that by carrying out such fermentations in the presence of an anion exchange resin a marked increase in production of the carboxylic transformation product is unexpectedly obtained. Hence, according to the invention, oxygenated hydrocarbon products having one or more carboxyl groups per molecule are obtained in improved yield by subjecting a hydrocarbon substrate in admixture with a nutrient medium and in the presence of an anion exchange resin to the aerobic action of a hydrocarbon-consuming microorganism that forms a carboxylic transformation product. This product has at least one carboxyl group and may or may not have other oxygen-containing groups such as hydroxyl, keto, aldo, etc. The carboxylic product as it forms undergoes ion exchange and becomes bound to the resin. Thereafter the ion exchange resin is separated from the fermentation medium and the carboxylic transformation product is recovered from the resin. Preferably the minor amount of this product which usually remains in solution in the broth is also recovered. The presence of the anion exchange resin during the fermentative action results in a distinctly greater production of the carboxylic transformation product by the microorganism than otherwise would be obtained.

Ion exchange resins have been employed heretofore in connection with fermentation processes but usually as a means of separating products from the broth after the fermentation has been completed. Most proposals for the use of ion exchange resins in the fermentation field have been concerned with the recovery of antibiotics from fermentation broths. A discussion of microbiological applications for such resins and a list of references relating thereto appear in an article in "Bacteriological Reviews," vol. 24, pages 251–260 (1960). Also in United States Patent No. 3,000,792 the inclusion of ion exchange resins in fermentation mixtures during fermentations for production of certain antibiotics is disclosed. This patent shows that, although a decrease in total production of the desired antibiotic resulted, the recovery of the antibiotic from the resins is substantially more (25%) than when the resin is used only after the broth has been harvested.

As a general rule heretofore, it has been thought that ion exchange resins would have a inhibitory effect on the growth of microorganisms and hence should not be present during fermentation. This is illustrated, for example, in the textbook by Calmon and Kressman entitled "Ion Exchangers in Organic and Biochemistry" (Interscience Publishers, Inc., 1957) which refers on page 620 to the suppressive action of ion exchange resins on microbes. Likewise in "Ion Exchange and Its Application" (Soc. of Chem. Ind., London, 1955) reference is made to the sterilizing effect of anion exchange resins on microorganisms, such effect being attributed not only to physical attraction of the cells by the resin but also its ability to destroy them. A further illustration of this general concept is revealed in "Dissertation Abstracts," vol. 16, page 1697 (1956), which is an abstract of a doctoral thesis entitled, "Studies of the Antimicrobial Properties of Ion Exchange Resins."

From the prior art as exemplified above one might well expect that the presence of an ion exchange resin during fermentation of hydrocarbons would be detrimental when it is desired to produce a hydrocarbon carboxylic transformation product. Applicants have found, on the contrary, that microorganisms capable of producing this kind of product will in fact produce more of it provided that the ion exchange resin employed in an anion exchanger. This improvement obtains generally where hydrocarbons of any type are biologically oxidized to form oxygenated hydrocarbons having at least one carboxyl group per molecule.

In practicing the present invention either a weak anion exchange resin or a strong anion exchange resin can be used. Various specific anion exchange resins are commercially available and any of these which have sufficient purity can be used. These generally are composed of a styrene-divinylbenzene matrix having attached thereto basic nitrogen-containing groups which are amino groups in the case of the weakly basic exchangers and quaternary ammonium groups in the case of the strongly basic type. Preferably the weak anion exchange resins are employed for the present purpose. The resins as obtained commercially usually have hydroxy groups as the anion associated with these nitrogen-containing groups. Prior to use in the process, the resin should be washed thoroughly with water to remove any excess basic nitrogen and any other soluble impurities, and the OH groups can be replaced by other anions, such as phosphate or chloride, by treatment of the resin with an aqueous solution containing an appropriate concentration of such other anion. While such replacement of the OH groups is not essential, it may be advantageous in some cases. Also before use, it is frequently desirable to sterilize the resin using any suitable procedure, e.g., heating to 130° C. in accordance with conventional sterilization practice.

Fermentations of hydrocarbons in accordance with the invention can be conducted aerobically in known manner except that an anion exchange resin is in contact with the broth while the fermentation reaction is proceeding. The amount of resin employed can vary widely and will depend upon such factors as its ion exchange capacity, the hydrocarbon feed and the particular microorganism utilized to effect the conversion. As a general rule the amount of resin should be at least that theoretically needed for absorbing most of the carboxylic acid product which will be obtained. Usually commercial anion exchange resins have exchange capacities of the order of 1–2 milliequivalents of the carboxylic transformation product per gram of resin and an excess of the resin over that calculated from the known exchange capacity will be employed. A considerable excess is not detrimental except that large excessive amounts may increase material handling and processing problems. Typical amounts of resin for use in the process usually are in the range of 20–200 grams per liter of nutrient medium.

The nutrient medium used in the process should contain sources of available nitrogen, phosphorous, sulfur and magnesium and may contain various trace elements and vitamins as conventionally employed or as required by the particular microorganism being used. Mineral salts customarily used for supplying such elements in biological fermentations can be employed. Examples of suitable nitrogen sources are ammonium salts such as $(NH_4)_2SO_4$ or $NH_4Cl$, nitrate salts such as $NH_4NO_3$ or $NaNO_3$, urea, soybean meal and other organic nitrogen sources. The following illustrates a suitable mineral salt composition for the following purpose:

|  | Conc., g./l. of $H_2O$ |
| --- | --- |
| $MgSO_4 \cdot 7H_2O$ | 0.2 |
| $Na_2CO_3$ | 0.1 |
| $CaCl_2 \cdot 2H_2O$ | 0.01 |
| $MnSO_4 \cdot H_2O$ | 0.02 |
| $FeSO_4 \cdot 7H_2O$ | 0.005 |
| $Na_2HPO_4$ | 3.0 |
| $KH_2PO_4$ | 2.0 |
| Urea | 2.0 |

This mineral salt composition normally would have a pH of about 7.1. When it is desired to carry out the fermentation of a pH below 7, the amount of $KH_2PO_4$ relative to $Na_2HPO_4$ can be increased to reduce the pH to a lower level.

The fermentation can be carried out batchwise or in continuous fashion using either growth or non-growth conditions. In one manner of practicing the invention a mixture of nutrient medium and sterilized anion exchange resin is prepared in a fermentor provided with means for stirring and for effecting aeration, the mixture is inoculated with the selected hydrocarbon-consuming microorganism and the fermentation is then effected by adding the hydrocarbon feed while maintaining fermentation conditions. Generally a temperature in the range of 20–40° C. will be employed and the pH will be maintained in the range of 4–9, usually 6–8. The hydrocarbon may be added continuously or incrementally while the mixture is being vigorously agitated and aerated and preferably is added throughout the fermentation rather than all at once. Hydrocarbon feed can be added at the start of the fermentation or the cells can be grown first on some other substrate and the hydrocarbon added later at appropriate times during the fermentation. As the fermentation proceeds the desired carboxylic transformation product as it is formed undergoes ion exchange with and becomes bound to the resin, except for a minor proportion of product which usually remains dissolved in the broth at equilibrium with the resin phase. Feeding of the hydrocarbon is continued preferably until the maximum accumulation of carboxylic product has occurred. The anion exchange resin is separated from the broth as by filtration and thereafter the carboxylic transformation product is displaced from the resin by treatment with an aqueous solution either of alkali or of acid. If desired the minor amount of carboxlic product remaining in the broth can also be recovered by filtering or centrifuging out the cells, acidifying the supernate and then extracting it by means of a suitable solvent such as ether.

The invention can also be practiced without having the anion exchange resin admixed with the entire broth undergoing fermentation as above described. In fact, stirring of the broth with the particulate resin dispersed therein may be disadvantageous in that it may cause comminution of the resin to such small size as to be unsuitable for re-use in the process. Since the cost of the resin constitutes a substantial part of the overall cost of the process, it is highly desirable that the resin be recoverable in a form suitable for re-use. Commercially available resins vary considerably in durability under agitation conditions used in fermentations, so that some grades can be used satisfactorily in the procedure above described while others would be unsuitable. In order to avoid the possibility of comminuting the resin, it can be confined within the fermentation system at a locus separate from the stirrer. For example, the ion exchange resin can be disposed within the fermentor in a compartment formed by a screen through which the agitating cell-containing broth flows for contact with the resin. Also the resin can be disposed in a zone outside of the aeration vessel and the fermenting cell-containing mixture can be continuously circulated back and forth between the two. Any other suitable manner of conducting the fermentation can be employed, provided that cell-containing broth continuously contacts the anion exchange resin for removal of the carboxylic transformation product as the fermentation proceeds.

As previously stated either a weakly basic or a strongly basic anion exchange resin can be used for the present purpose. However it is usually preferable to employ weak exchange resins, as higher yields of the desired carboxylic product often are obtained by doing so. After the fermentation, recovery of the product from the resin can be accomplished by contacting it with an aqueous solution of an acid such as hydrochloric, phosphoric, formic or acetic acid. In some cases the carboxylic acid product may be insoluble in water but soluble in an alcohol, in which event methanol or ethanol can be used for preparing the acid displacing medium. As an alternative procedure either form of anion exchange resin can be regenerated by means of caustic soda or other alkali metal hydroxide. When this is done the product is obtained in its alkali metal salt form rather than as free carboxylic acid.

Particularly attractive applications of the use of anion exchange resins in accordance with the invention reside in the transformation of various aromatic hydrocarbons to oxygenated acidic products of commercial interest. The following aromatic hydrocarbon conversions are of particular interest:

(1) Transformation of methyl-substituted benzenes to methyl-substituted muconic acids by special strains of Nocardia, as disclosed in Raymond and Jamison United States application Ser. No. 509,621, filed Nov. 24, 1965, now U.S. Pat. No. 3,383,289. An example is the formation of $\alpha,\alpha'$-dimethylmuconic acid (herein for convenience referred to as DMMA) from p-xylene by means of a strain of Nocardia corallina, a culture of which has been deposited with the American Type Culture Collection, Washington, D.C., under the number ATCC 19,070. This conversion is illustrated by the following equation:

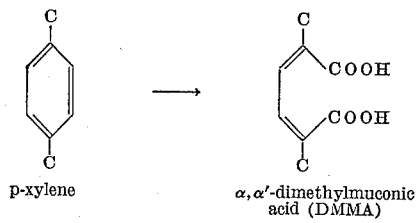

p-xylene     $\alpha,\alpha'$-dimethylmuconic acid (DMMA)

(2) Transformation of methyl-substituted benzenes to 2,3-dihydroxybenzoic acids and alkylbenzoic acids by means of other strains of Nocardia, as also disclosed in the aforesaid application. An example of this is the conversion of p-xylene in accordance with the equation below by means of either a strain of Nocardia salmonicolor designated by the American Type Culture Collection as ATCC No. 19,149 or another strain of Nocardia corallina identified as ATCC No. 19,147.

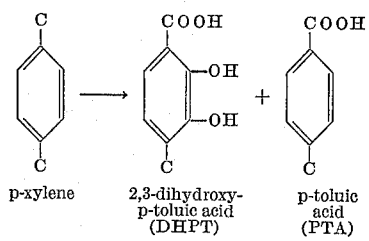

p-xylene    2,3-dihydroxy-p-toluic acid (DHPT)    p-toluic acid (PTA)

(As indicated, these specific acid products are herein referred to for convenience, respectively, as DHPT and PTA.)

(3) Transformation of naphthalene to salicylic acid employing, for example, Corynebacterium renale ATCC No. 15,075, as disclosed in United States Patent No. 3,183,169 and illustrated by the following equation:

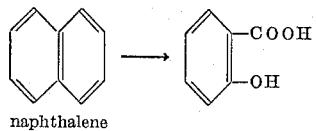

naphthalene (4) Transformation of dimethylnaphthalenes into methylcarboxynaphthalenes by means of, for example, Streptomyces achromogenes ATCC No. 15,077, as disclosed in Douros and Raymond United States application Ser. No. 309,889, filed Sept. 18, 1963, now U.S. Pat. No. 3,340,155. An equation illustrating this is:

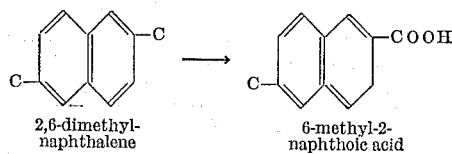

2,6-dimethyl-naphthalene     6-methyl-2-naphthoic acid

An analogous transformation is the conversion of 2-methylnaphthalene to 2-naphthoic acid by Pseudomonas aeruginosa (see "Oxygenases" by Hayaishi, page 266, Academic Press (1962)).

(5) Transformation of anthracene and phenanthrene via Pseudomonas aeruginosa to hydroxynaphthoic acids ("Oxygenases," pages 267–268).

The foregoing are merely illustrative of transformations for which the invention can be advantageously employed and many other specific hydrocarbon conversions could be recited in which the use of an anion exchange resin during fermentation will effect a marked increase in yield of the desired carboxylic acid product.

The manner of initially growing the microorganism and the time required for effecting the hydrocarbon conversion to obtain maximum yield of the desired product can vary widely depending upon the particular microorganism used and the hydrocarbon selected as feed. By way of example, when Nocardia strains referred to above are employed under growth conditions for conversion of p-xylene, it is usually desirable to start the growth using n-hexadecane or lard oil as substrate and allow growth to take place for 12–36 hours before the p-xylene is added. During this time the anion exchange resin need not be present although it may be since it will not inhibit growth provided it is of suitable purity. After this initial growth period the p-xylene is added continuously or intermittently, preferably at about the rate at which it is consumed and preferably in admixture with a minor amount of n-hexadecane for supporting growth. The anion exchange resin can be added immediately upon addition of the p-xylene or somewhat later as the amount of product becomes substantial. All of the resin can be introduced as a single batch or it can be added in incremental amounts throughout the course of the fermentation. In conversions of this kind maximum yields of DMMA, DHPT or PTA are usually obtained in 4–6 days after beginning p-xylene addition.

When Nocardia organisms are used under non-growth conditions for practicing the invention, cells grown as previously described are separated from the broth by centrifuging and washed with phosphate buffer solution and then are resuspended in phosphate buffer solution. Typically the suspension is maintained at say 30° C. and the p-xylene mixed with a minor amount of n-hexadecane is added periodically or continuously while the mixture is being aerated and stirred. Addition of the substrate is continued until the fermentation has given an optimum yield of the desired acid product.

The following examples are specific illustrations of the invention.

Example 1

A series of four shake flask runs was made in each of which p-xylene was subjected to oxidation by means of Nocardia corallina ATCC No. 19,147. This microorganism gives both dihydroxy-p-toluic acid (DHPT) and p-toluic acid (PTA) as products from p-xylene. It grows well on n-hexadecane and hence this paraffin was used for initially growing the cells and as a co-substrate during the conversion reaction. One run was a control in which no exchange resin was used, while the other three runs involved the use of a weakly basic commercial anion exchange resin in varying amounts as shown in the table below. The resin was in the phosphate form, having been washed and exchanged with a solution of $KH_2PO_4$ and $Na_2HPO_4$ containing about 5 milliequivalents of phosphate ion. The resin also had been sterilized by heat treatment. The procedure in these runs involved innoculating 100 ml. of the mineral salts solution in a 500 ml. shake flask with the organism, shaking the flask at 30° C. and periodically adding small amounts of n-hexadecane for cell growth for 6 days. Then increments of p-xylene were added daily as it was consumed, the additions being in the form of 0.2 ml. portions of a 90:10 mixture of p-xylene:n-hexadecane. In the three runs where the anion exchanger was used, approximately half of it was added upon first addition of the p-xylene (i.e., on the 6th day) and the rest was added on the 11th day. All runs were continued for a total of 14 days. The products were then worked up and analyzed. This was done by decanting the beer from the resin, filtering the cells from the beer, and recovering the carboxylic acids from the beer and from the resin in the form of methanol solutions. The filtered beer was acidified with HCl and extracted with ethyl ether, the ether was evaporated, the residue was dissolved in methanol and the resulting solution was analyzed by U.V. spectroscopy. The resin was treated with a 5% HCl solution in methanol to displace the products therefrom and the methanolic product solution was analyzed in similar fashion. Table I shows the concentrations of DHPT and PTA in the final mixture for each run in terms of grams per liter of the entire mixture.

TABLE I
[Conversion of p-xylene via ATCC #19,147]

| Run No. | Amount of resin, g./l. of mixture | Carboxylic acid products | | |
|---|---|---|---|---|
| | | Total g. | Percent DHPT | Percent PTA |
| 1 (control) | 0 | 0.1 | | |
| 2 | 21 | 3.8 | 21 | 79 |
| 3 | 45 | 4.5 | 18 | 82 |
| 4 | 90 | 5.5 | 22 | 78 |

From the tabulated results it can be seen that use of the anion exchange resin during the fermentation caused a marked improvement in results. When no resin was employed, very little carboxylic acid product was obtained. The presence of resin caused a distinct increase in amounts of DHPT and PTA formed and the yields of these acids improved as the amount of resin was increased.

Example 2

Another series of runs was made in essentially the same manner using the same conditions as in the preceding example except that the microorganism employed was *Nocardia salmonicolor* ATCC No. 19,149. Again both DHPT and PTA were produced and the results as determined by U.V. spectroscopy are shown in Table II.

TABLE II
[Conversion of p-xylene via ATCC #19,149]

| Run No. | Amount o resin, g./l. of mixture | Carboxylic acid products | | |
|---|---|---|---|---|
| | | Total g. | Percent DHPT | Percent PTA |
| 5 (control) | 0 | 0.1 | | |
| 6 | 21 | 2.0 | 25 | 75 |
| 7 | 45 | 3.0 | 20 | 80 |
| 8 | 90 | 5.3 | 28 | 72 |

It can be seen that the results with this microorganism were about the same as with the *N. corallina* strain of the first example.

Example 3

Three comparative shake flask runs were made for converting p-xylene by means of *Nocardia corallina* ATCC No. 19,070 which organism is capable of converting p-xylene to DMMA. One run was a control utilizing no resin while the other two used, respectively, weakly basic and strongly basic anion exchange resins. The procedure in these runs involved innoculating 100 ml. of mineral salts solution in a 500 ml. shake flask with the organism, adding 0.05 ml. of n-hexadecane, shaking at 30° C. for 24 hours, thereafter adding small amounts of p-xylene together with n-hexadecane from time to time and shaking for a total time of the order of 96 hours. In the runs in which the ion exchangers were used, a portion of the resin equivalent to 15 g./l. of mineral salts medium was added at 24 hours and the rest amounting to 30 g./l. was added at 48 hours. After the fermentation the product was worked up and tested similarly as in Example 1. Results are given in Table III.

TABLE III
[Conversion of p-xylene via ATCC #19,070]

| Run No. | Resin Used | DMMA Yield, g./l. of mixture | | |
|---|---|---|---|---|
| | | In Broth | In Resin | Total |
| 9 (control) | None | 0.62 | | 0.62 |
| 10 | Weakly basic | 0.41 | 2.16 | 2.57 |
| 11 | Strongly basic | 0.21 | 1.22 | 1.43 |

In all three runs DMMA was the only carboxylic acid detected in the product. The results again illustrate the fact that presence of the anion exchanger during fermentation markedly increases the yield. The data show that a better improvement in yield was effected by the weakly basic resin than by the more strongly basic material.

Example 4

Another set of comparative shake flask runs was made to demonstrate the effect of an anion exchange resin of the weakly basic type in the conversion of naphthalene to salicylic acid by means of a *Corynebacterium n. sp.* One run was a control, and in the other two runs different amounts of the anion exchanger were used. In each run 100 ml. of the same mineral salts solution to which 0.01% yeast extract had been added were used and about one gram of naphthalene was added at the start. In Run 13 about 20 g./l. of the resin was added at 24 hours and another 20 g./l. at 72 hours, while in Run 14 twice this total amount of resin was added in increments of 20 g./l. initially, 20 g./l. at 24 hours and 40 g./l. at 72 hours. The flasks were maintained at 30° C. and shaken for about 7 days. The only product obtained was salicylic acid and the total yields thereof as determined by U.V. analysis are shown in Table IV.

TABLE IV
[Conversion of Naphthalene via C. n. sp.]

| Run No. | Amount of resin used, g./l. | Total Yield of salicylic acid, g./l. |
|---|---|---|
| 12 (control) | None | 1.5 |
| 13 | 40 | 4.1 |
| 14 | 80 | 5.7 |

These results again demonstrate the effectiveness of anion exchange resins in increasing the yield of carboxylic product from hydrocarbon fermentation.

Example 5

A run had been made in a 40 l. fermentor, without any ion exchange resin, for converting p-xylene by means of *Nocardia corallina* ATCC No. 19,071 which is a mutant of the strain employed in Example 3. At the end of 24 hours some DMMA had been accumulated but only in amount of 0.5 g./l. and conversion had stopped. Several samples (100 ml) of the broth were then transferred to shake flasks to which various anion exchange resins were also added in proportion of 30 g./l., the mixtures were continuously shaken at 30° C. and small increments of a 90:10 mixture of p-xylene to n-hexadecane were added from time to time as the fermentation proceeded. At the end of 45 hours the broths were harvested and analyzed for DMMA which was the main carboxylic acid accumulated. PTA also was formed in minor amounts in these runs but the contents thereof were not determined. The anion exchange resins used were of the weakly basic type and included two different commercial products (designated A and B) each of which had been converted by ion exchange to a chloride form and also to a phosphate form. Results are shown in Table V.

TABLE V
[Conversion of p-xylene via ATCC #19,071]

| Run No. | Type of Resin Used | DMMA Yield, g./l. of mixture | | |
|---|---|---|---|---|
| | | In Broth | In Resin | Total |
| 15 | Resin A, chloride | 3.5 | 5.9 | 9.4 |
| 16 | Resin A, phosphate | 1.6 | 5.2 | 6.8 |
| 17 | Resin B, chloride | 1.7 | 0.2 | 1.9 |
| 18 | Resin B, phosphate | 1.3 | 0.5 | 1.8 |

These results show that the improvement in yield achieved by employing an anion exchange resin can vary depending upon the particular resin used but that in any case a substantial improvement can be effected. In the present instances cells which had produced only 0.5 g./l. of DMMA and which had ceased producing it were caused to produce considerably more DMMA than originally by the presence of the resins. Both forms of Resin A resulted in a remarkable increase (13- to 19-fold) in production of this dicarboxylic acid.

Example 6

This example illustrates use of the invention to produce p-toluic acid (PTA) in high yield from p-xylene. The microorganism was the *Nocardia corallina* ATCC No. 19,147 strain employed in Example 1, but under the conditions of the present run only trace amounts of DHPT were produced. The fermentation was done in a stirred 2800 ml. Fernbach flask using 500 ml. of the mineral salt solution and a temperature of 30° C. After innoculation of the mixture, n-hexadecane (2 ml. in increments) was used for growing the microorganism during the first 3 days. Then incremental feed of p-xylene mixed with a minor amount of n-hexadecane was begun, amounts employed being 9 ml. of a 75:25 mixture during the 3–5 day period and 35 ml. of a 90:10 mixture during the 5–13 day period. Feeding of the 90:10 mixture was continued to the 18th day, and accumulation of PTA continued to occur with no indication of any decrease in microbial activity. On the 9th and 11th days weakly basic anion exchange resin in the phosphate form was added in amounts, respectively, of about 10 g./l. and 50 g./l. Samples of the broth were taken at intervals throughout the fermentation, and the total contents of PTA found by U.V. analysis are shown in Table VI.

TABLE VI

[Conversion of p-xylene via ATCC #19,147 (Run No. 19)]

| Days from start: | Amount of resin present, g./l. | PTA Yield, g./l. of mixture |
|---|---|---|
| 6 | 0 | 0.2 |
| 7 | 0 | 0.3 |
| 8 | 0 | 1.0 |
| 9 | 10 | |
| 11 | 60 | |
| 12 | 60 | 9.2 |
| 13 | 60 | 13.6 |
| 15 | 60 | 15.0 |
| 18 | 60 | 24.2 |

The tabulated results show only a low level of PTA production until the anion exchange resin was added. After its addition a high rate of PTA accumulation occurred and a remarkably good yield was exhibited.

Example 7

Two batch runs were made in stirred fermentors using *Nocardia corallina* designated as ATCC No. 19,070. In one run (Run No. 21) a mixture of 480 ml. of a weakly basic anion exchange resin (48 g./l.) and sufficient mineral salts solution to make a total volume of 3000 ml. were used. The other (Run No. 20) was a control using 3000 ml. of mineral salt solution without resin. The medium in each case also contained 0.2% peptone and 0.1% beef extract and its pH was maintained at about 6.5. Following innoculation the organism was allowed to grow on n-hexadecane for 36 hours and thereafter p-xylene was added in small amounts from time to time while the mixture was being stirred and aerated at 30° C. Each run was conducted for 120 total hours and 24 ml. of p-xylene total were used. The kinds and amounts of products, including those adsorbed on the anion exchange resin as well as those in the broth, were then determined. Results are shown in Table VII.

TABLE VII

[Conversion of p-xylene via ATCC #19,070]

| Product | Product amount, g./l. | |
|---|---|---|
| | Without resin (Run No. 20) | With resin (Run No. 21) |
| DMMA | 0.2 | 12.2 |
| DHPT | 0 | 0.7 |
| PTA | 0 | 1.0 |
| DMC [1] | 0 | 0.5 |

[1] 3,6-dimethylcatechol.

These results show a striking improvement in product accumulation, particularly the DMMA product, as a result of the use of the anion exchanger.

We claim:

1. A process for the microbiological oxidation of a hydrocarbon substrate which comprises subjecting said substrate in admixture with an aqueous nutrient medium and in the presence of an anion exchange resin to the aerobic action of a hydrocarbon-consuming microorganism that forms a carboxylic transformation product, whereby the carboxylic transformation product as it is formed undergoes ion exchange with and becomes bound to the resin, thereafter separating from the mixture said anion exchange resin containing the carboxylic transformation product, and displacing said carboxylic transformation product from said resin.

2. Process according to claim 1 wherein said substrate is an aromatic hydrocarbon.

3. Process according to claim 2 wherein said substrate is a methyl-substituted benzene.

4. Process according to claim 3 wherein said substrate is p-xylene.

5. Process according to claim 1 wherein said substrate is naphthalene.

6. Process according to claim 1 wherein said resin is a weakly basic anion exchange resin.

7. Process according to claim 6 wherein the amount of resin used is in the range of 20–200 g. per liter of nutrient medium.

8. Process according to claim 7 wherein said substrate is an aromatic hydrocarbon.

9. Process according to claim 8 wherein said substrate is a methyl-substituted benzene.

10. Process according to claim 1 wherein the amount of resin used is in the range of 20–200 g. per liter of nutrient medium.

References Cited

UNITED STATES PATENTS

| 3,000,792 | 9/1961 | Denkewalter et al. | 195—116 X |
| 3,057,784 | 10/1962 | Davis et al. | 195—28 |
| 3,222,258 | 12/1965 | Iizuka et al. | 195—29 |
| 3,326,770 | 6/1967 | Coty | 195—3 |

LIONEL M. SHAPIRO, *Primary Examiner.*

U.S. Cl. X.R.

195—116; 210—17